Dec. 17, 1957 N. B. NORTON 2,816,963

TELEPHONE HAND-PIECE SUPPORT AND HOLDER

Filed Aug. 21, 1956

INVENTOR.

N. B. NORTON

Nathaniel B. Norton

United States Patent Office
2,816,963
Patented Dec. 17, 1957

2,816,963

TELEPHONE HAND-PIECE SUPPORT AND HOLDER

Nathan B. Norton, Webster Groves, Mo.

Application August 21, 1956, Serial No. 605,285

1 Claim. (Cl. 179—157)

The invention relates to improvements for supporting and holding a telephone hand-piece, when in use, of the design having a transmitter at one end and a receiver at the other end, being the conventional and standard design of telephone hand-piece.

The object and purpose of the invention is to provide greater convenience and comfort and benefit to telephone users.

It attaches to the hand-piece near midway between the transmitter and the receiver and rests upon the user's shoulder. It may be used on either side, right or left. It does not interfere with the normal functions of the hand-piece in relation to the telephone base piece. It does not hinder the user in holding the hand-piece by hand.

Figure 1:
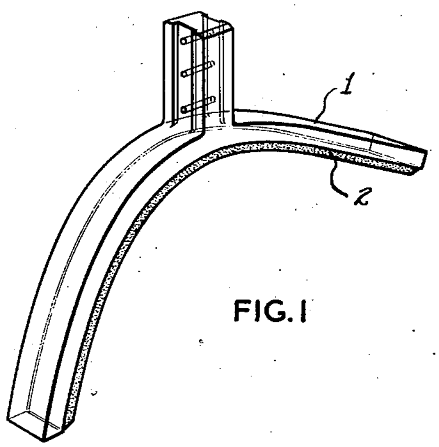

Figure 1 of the accompanying drawings shows the base piece 1 and the foam rubber lining 2.

Figure 2:
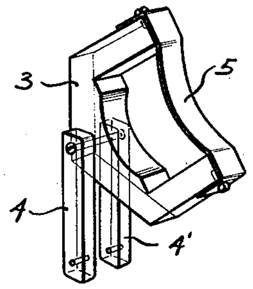

Figure 2 shows the two-prong fork-like piece 3, the two riser pieces 4, and the holding clamp 5.

Figure 3:
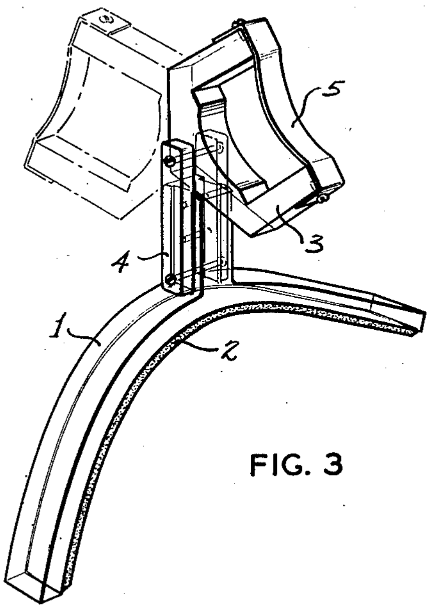

Figure 3 shows the pieces assembled ready for use, with the riser pieces 4 fitted between the flanges of the upward extending portion of the base piece 1.

The riser pieces may be secured between the flanges at any one of the three heights indicated by the holes through the upward extending portion of the base piece.

The fork-like piece may be pivoted to opposite position as indicated, making the assembly and the telephone hand-piece instantly ready for use on the user's other shoulder.

Having thus identified the various pieces of the invention, and saving the provision to make helpful changes without departing from the design, I claim:

A support and holder for conventional telephone hand-pieces when in use, comprising a base piece which rests on the user's shoulder extending downward to front and rear in a crescent-like curve having an integral portion extending upward from a point near the crest of the curve and to the forward side of the user's shoulder, the said integral portion having flat forward and rearward sides, the edges of said sides having flanges forward and rearward; two flat riser pieces which fit perpendicularly between the said flanges and are secured there at adjustable heights by a stud extending through corresponding holes in these pieces and the said upward extending portion of the base piece; a two-prong fork-like piece shaped between the prongs to receive the handle portion of a telephone hand-piece, the said prongs extending straight, one above the other, and horizontally from the solid portion of the piece as it fits vertically between the upper ends of the said riser pieces and is secured there by a stud extending through corresponding holes in the rsier pieces and a hole in the said solid portion of this piece thereby placing the telephone hand-piece lengthwise forward and rearward and placing the transmitter and the receiver in suitable poistion for conversation by the user, the said hole in the solid portion of this piece being located centrally between the top and bottom lines of the piece thus permitting the piece to pivot on the said stud whereby the transmitter and the receiver may be tilted as desired, and the piece together with the telephone-hand-piece may be pivoted over to the opposite position thereby making the entire assembly instantly ready for use on the user's other shoulder.

No references cited.